United States Patent
Cody et al.

(10) Patent No.: US 7,822,704 B2
(45) Date of Patent: Oct. 26, 2010

(54) TEXT EXPLANATION FOR ON-LINE ANALYTIC PROCESSING EVENTS

(75) Inventors: William F. Cody, San Jose, CA (US); Vikas Krishna, San Jose, CA (US); Justin T. Lessler, San Jose, CA (US); William S. Spangler, San Martin, CA (US); Jeffrey T. Kreulen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 11/841,217

(22) Filed: Aug. 20, 2007

(65) Prior Publication Data

US 2007/0282830 A1   Dec. 6, 2007

Related U.S. Application Data

(62) Division of application No. 10/449,792, filed on May 30, 2003, now Pat. No. 7,383,257.

(51) Int. Cl.
G06F 17/30 (2006.01)
(52) U.S. Cl. .................. 707/600; 707/769; 715/259
(58) Field of Classification Search ............. 707/3, 707/4, 5, 6, 100, 600, 736, 752, 753, 748, 707/749, 769, 811, 711, 776; 704/5, 7, 9, 704/10; 715/254, 255, 259
See application file for complete search history.

(56) References Cited

U.S. PATENT DOCUMENTS

| | | | |
|---|---|---|---|
| 5,297,039 A | 3/1994 | Kanaegami et al. | |
| 6,016,394 A * | 1/2000 | Walker | 717/104 |
| 6,175,828 B1 * | 1/2001 | Kuromusha et al. | 707/3 |
| 6,397,207 B1 | 5/2002 | Bleizeffer et al. | |
| 6,434,557 B1 | 8/2002 | Egilsson et al. | |
| 6,446,061 B1 * | 9/2002 | Doerre et al. | 707/3 |
| 6,523,028 B1 | 2/2003 | DiDomizio et al. | |
| 6,684,207 B1 * | 1/2004 | Greenfield et al. | 707/3 |
| 6,751,621 B1 | 6/2004 | Calistri-Yeh et al. | |
| 6,983,287 B1 * | 1/2006 | Jayanti et al. | 707/102 |
| 2002/0152208 A1 * | 10/2002 | Bloedorn | 707/6 |
| 2003/0088562 A1 * | 5/2003 | Dillon et al. | 707/5 |
| 2004/0049505 A1 * | 3/2004 | Pennock | 707/5 |
| 2004/0158560 A1 | 8/2004 | Wen et al. | |

OTHER PUBLICATIONS

Fischer, et al., "Cognitive Tools For Locating and Comprehending Software Objects for Reuse," IEEE, 1991, pp. 318-328.

* cited by examiner

*Primary Examiner*—Greta L Robinson
(74) *Attorney, Agent, or Firm*—Gibb I.P. Law Firm, LLC

(57) ABSTRACT

A method and structure for analyzing a database having non-text data in data fields and text in text fields. The invention first selects a subset of the database based upon criteria. The subset includes data field(s) and associated text field(s). The invention searches for data matching the criteria within structured data fields of the database. If the invention searches multiple databases, the invention creates shared dimensions for databases that do not share common attributes. The invention automatically selects a relatively short text phrase from the text fields that helps to explain the underlying meaning (i.e. unique text content) of a data subset selected using the non-text data fields.

28 Claims, 7 Drawing Sheets

Product Dimension (20)

| PKey | Group | Type | Product |
|------|-------|------|---------|
| 01 | Software | Database | DB2 |
| 02 | Software | Messaging | MQ Series |
| 03 | Hardware | Server | S/390 |
| 04 | Hardware | PC | Thinkpad T20 |
| ... | | | |

Geography Dimension (21)

| GKey | Country | State | City |
|------|---------|-------|------|
| 01 | USA | CA | San Jose |
| 02 | USA | NY | NY |
| 03 | USA | IL | Chicago |
| 04 | Canada | Quebec | Toronto |
| ... | | | |

Revenue Facts (22)

| PKey | GKey | Dkey | Revenue | Units |
|------|------|------|---------|-------|
| 01 | 01 | 02 | 1000 | 1 |
| 01 | 02 | 02 | 2000 | 2 |
| 03 | 03 | 03 | 25000 | 5 |
| 04 | 04 | 04 | 20000 | 2 |
| ... | | | | |

Date Dimension (23)

| DKey | Year | Quarter | Day |
|------|------|---------|-----|
| 01 | 2002 | Q1 | Jan 1 |
| 02 | 2002 | Q2 | Apr 15 |
| 03 | 2001 | Q4 | Dec 10 |
| 04 | 2001 | Q3 | Aug 20 |
| ... | | | |

FIG. 2

FIG. 5 a higher rate of failure than others for the previous month. This is the "what" answer. With this invention the analyst might quickly discover that these selected products had a higher rate of "frayed power cords" than seen in other

TEXT EXPLANATION FOR ON-LINE ANALYTIC PROCESSING EVENTS

CROSS-REFERENCE TO RELATED APPLICATIONS

This application is a divisional of U.S. application Ser. No. 10/449,792 filed May 30, 2003, now U.S. Pat. No. 7,383,257 the complete disclosure of which, in its entirety, is herein incorporated by reference.

BACKGROUND OF THE INVENTION

1. Field of the Invention

The present invention generally relates to database analysis and more particularly to a method and system that automatically produces text explanations for data events that occur in the database.

2. Description of the Related Art

Conventional systems analyze data or text independently, but not both together in an integrated fashion. Past approaches to using text in On-line Analytic Processing (OLAP) tools rely on feature extraction to reduce the text to a small number of pre-selected features.

The invention described below presents a novel approach to using text associated with data. The inventive approach assumes no knowledge about what features are contained in the text data. In particular, with the invention, carefully selected segments of the text can be used to "explain" unusual statistical anomalies (events) in the data.

SUMMARY OF THE INVENTION

In one embodiment the invention presents a method of analyzing a database having non-text data in data fields and text in text fields. The method first selects a subset of the database based upon criteria. The subset includes data field(s) and associated text field(s). The selecting process searches for data matching the criteria within structured fields of the database. If the invention searches multiple databases, the invention creates shared dimensions for databases that do not share common attributes. The invention can manually or automatically select a representative text field from the associated text fields.

The invention generates a dictionary from terms in the associated text field(s) by selecting the most frequently occurring corpus terms in the associated text field(s). The invention analyzes the dictionary to generate a probability value for each term in the dictionary. This includes a statistical analysis that determines the probability that each term is independent of the search criteria. The analyzing process indicates how well each term in the dictionary relates to the criteria.

For low probability terms (terms that have a probability value lower than a predetermined threshold) the invention calculates the dependency of such low probability terms to the criteria. The dependency is found by calculating entropy of each term for the criteria and sorting the terms in reverse order of symmetrical dependency. The invention then identifies portions of the text that include high dependency terms (that have a dependency ranking above a predetermined minimum dependency) as representative text descriptions. The representative text descriptions can be only those text fields that include all the high dependency terms. The invention can also optionally select the shortest phrase, shortest sentence, shortest paragraph, etc. containing all of the high dependency terms as the representative text description.

In addition, the invention can generate probability values and dependency values (using the same processes mentioned above) for data fields that are not within the subset, but are related to data fields that are within the subset. This invention enables data analysts to quickly discover the underlying meaning behind a selected subset of data. A subset of data selected via any database query is compared to the superset of all data along an unstructured text dimension. The result is a simple phrase or sentence that indicates how this subset differs from the superset in terms of representative content. This allows the data analyst to answer the question "why" in addition to answering the question "what". For example, prior to the invention, a data analyst might discover that some products had a higher rate of failure than others for the previous month. This is the "what" answer. With this invention the analyst might quickly discover that these selected products had a higher rate of "frayed power cords" than seen in other products during other periods of time. This answers the question "why". In general this invention gleans detailed information from the unstructured text field in the database and applies it in a meaningful way to query results. This can benefit any database analysis where the data is a mixture of structured and unstructured information.

BRIEF DESCRIPTION OF THE DRAWINGS

The foregoing and other objects, aspects and advantages will be better understood from the following detailed description of a preferred embodiment(s) of the invention with reference to the drawings, in which:

FIG. 2 is a schematic diagram illustrating example dimension tables;

FIG. 5 is an example report of the Sapient tool;

DETAILED DESCRIPTION OF PREFERRED EMBODIMENTS OF THE INVENTION

The invention provides a methodology of a system for producing text explanations of abnormalities or events that occur within a database. With the invention, a user can search for a certain abnormality (for example a certain spike in consumer complaints during a certain period of time) and the invention will automatically produce a textual explanation for that event within the data.

Figure 1:
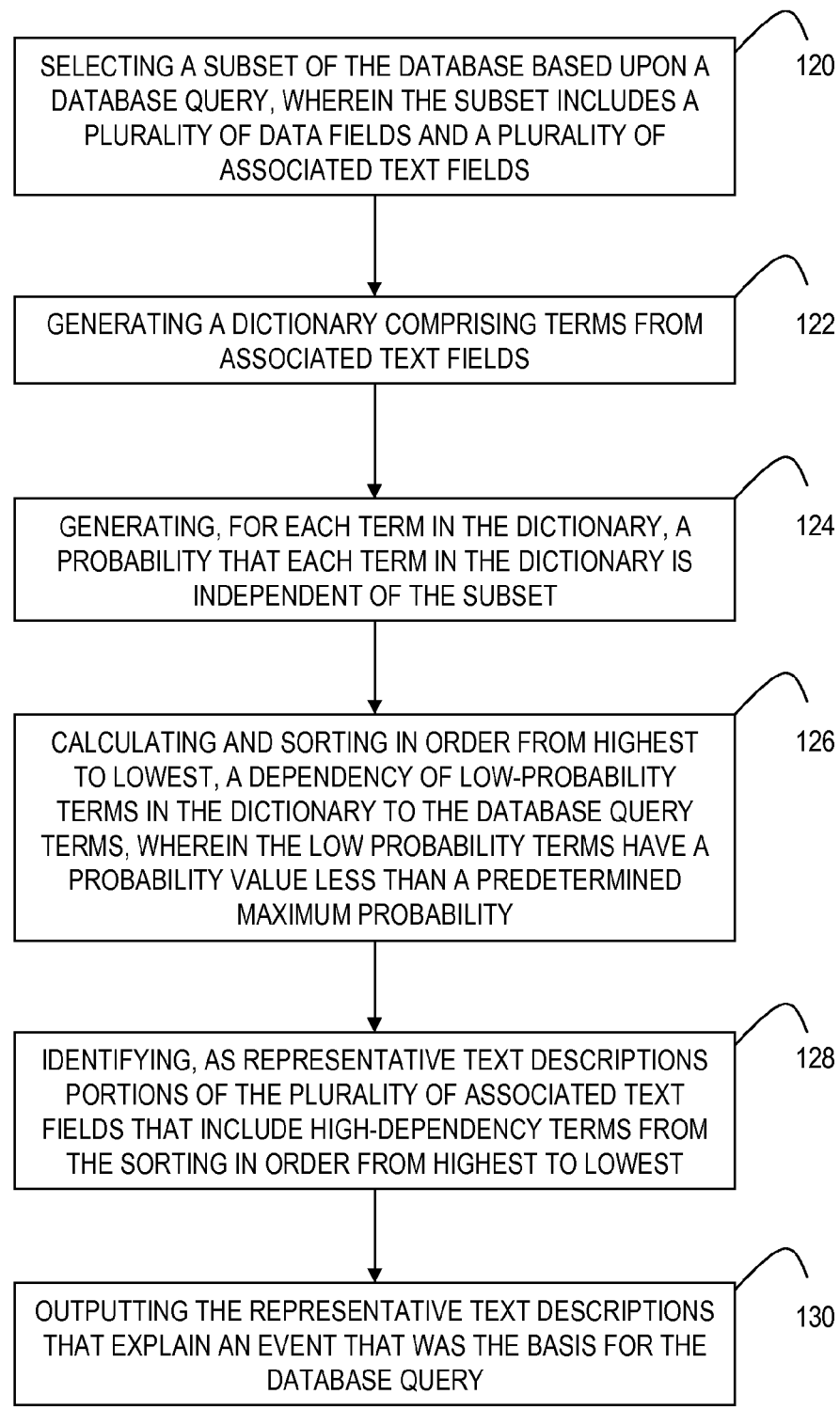
FIG. 1 is a flow diagram illustrating a preferred method of the invention.

FIG. 1 is a flowchart which illustrates one example of the processing steps taken during the inventive process. More specifically, the flowchart illustrates that the invention first searches the database using a query to obtain a subset of the database in item 120. The invention generates a dictionary in item 122 from terms within text fields that are part of the subset obtained in item 120. Next, in item 124, the invention generates probabilities regarding the independence between the terms in the dictionary and the query. The invention then calculates the dependency of the low-probability terms identified in the items on the search criteria in item 126. Finally, in item 128, the invention identifies those text sections in the database subset that include all high dependency terms identified in item 126 and uses those text sections to automatically explain 130 the event or abnormality that was the basis for the query. Each of the forgoing processing steps is explained in greater detail below.

The following description provides examples and a detailed discussion regarding the features of the invention. In the following description it is assumed that the data set contains N records (examples) with each record containing one or more structured dimensions (S), and one or more text fields (T). As mentioned above, in item 120, the invention first selects a subset of the database based upon criteria (e.g., a search query). The subset includes data field(s) and associated text field(s). The selecting process searches for data matching the criteria within structured fields of the database. Thus, using well-established OLAP techniques the user creates the subset from the database by selecting a subset, R, of the N examples (e.g., all department store sales in the midwest) using some type of query.

The user can select a text field to be used in explaining the database subset or the invention can automatically utilize some or all associated text fields as identified by the source system. Typically, the text resides within the same source system database that the data came from, the text resides in a source system that has attributes/columns that logically correspond to the data source systems, or the text has independent or no attributes associated with or corresponding to the data. The process of providing a choice of associated text field is straightforward when the text resides within the same source system database that the data came from and attributes can be used as shared dimensions for the data and document cube. If the text resides in a source system that has attributes/columns that logically correspond to the data source systems, the invention performs a normalization process to identify common elements from slightly different attribute tables. If the text has no attributes associated with or corresponding to the data, the invention uses classification and/or information extraction technology to associate a document with attributes.

Figure 3:
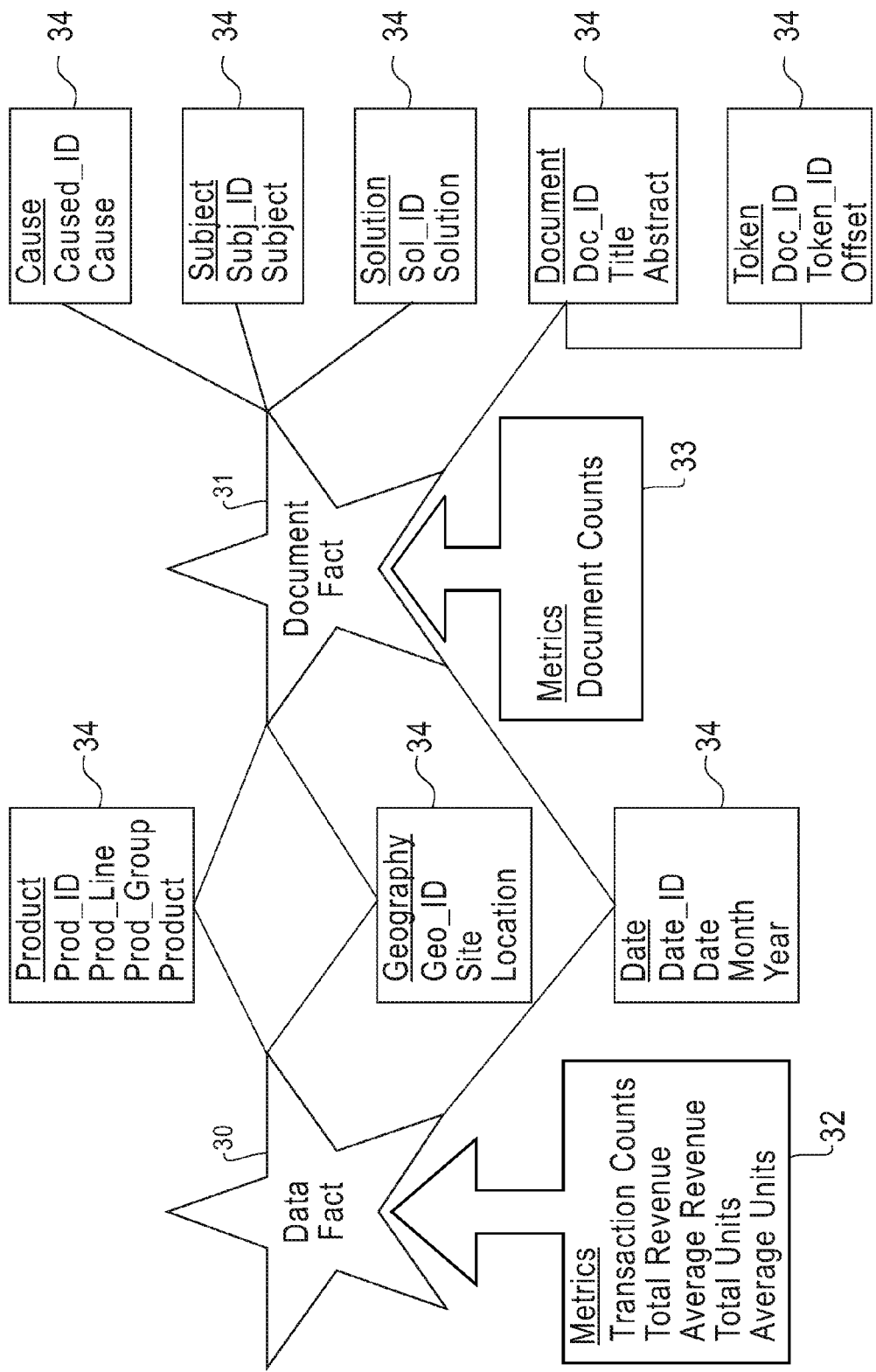
FIG. 3 is a data model of an example schema of the invention.

Attributes that can form useful dimensions to analyze that data or text are also identified. These dimensions could either be flat, such as an AUTHOR dimension where all that is known are the author names of the documents, say about opinions on a certain product. Hence the AUTHOR dimension tables simply contains two columns, one containing identifiers of each unique author name and the other the author names. Identified dimensions, as mentioned above, could also be hierarchical such as the GEOGRAPHY dimension as shown in FIG. 2. Dimensions that are identified in common to both the data and text star schemas, as shown in FIG. 3, are called shared dimensions and allow the invention to apply the same constraints to the other database while examining a narrowed down data set in one database. For example, an analyst might be able to look into a set of documents about a certain product, in a particular geography, during a specified time window in the document database while examining a downwards revenue trend for the same product, in the same geography, and during the same time window.

FIG. 2 illustrates examples of dimension tables for an example Product 20, Geography 21, and Date 23. Also shown is a sample fact table 22 containing foreign keys into the shown dimension tables and also two measures, revenue and units. A data model is implemented using a star schema as shown in FIG. 3, however it should be noted that the invention would work equally well with variants of the star schema, such as a snowflake.

In FIG. 3, each star schema 30, 31 have a fact table 32, 33 at the center and a corresponding set of dimension tables 34. Each fact table 32, 33 is a normalized table that includes a set of measures or facts and a set of attributes represented by foreign keys into a set of dimension tables. The measures are typically numeric and additive (or at least semi-additive). Because fact tables can have a very large number of rows, great effort is made to keep the columns as concise as possible. A dimension table is a highly de-normalized table that contains the unique descriptive attributes of each fact table entry. These attributes can consist of multiple hierarchies as well as simple attributes.

For each instantiation of this invention, the data model is defined. The data and text each come from one or multiple source systems. For both the data and the text, the information that is to be analyzed is identified within the source system (modeled) as either a fact or dimension. The data can be handled using standard data warehousing techniques, which usually involves identifying the appropriate columns in the appropriate tables within the source system database. Thus, the invention extracts, transforms and loads both the data and documents into the data model defined in step 120. This is typically done either with SQL or with simple executable programs to perform the necessary operations.

Therefore, as shown above, the source system will associate one or more text fields with the data fields that were found during the query based search in item 120. If there are a limited number of associated text fields, the invention can generate the dictionary from all associated text fields. Alternatively, the user can be provided with an option to select from the associated text fields. This option could be provided to the user if the number of associated text fields exceeded a predetermined minimum. If more than one field is chosen then the text from both fields is appended for each example.

If the invention searches multiple databases, the invention creates shared dimensions for databases that do not share common attributes. Thus, the invention creates shared dimensions for databases that do not share common attributes. With respect to the creation of shared dimensions, let X and Y be the two star schemas the invention wishes to relate using a shared dimension. Let D be the shared dimension the invention wishes to relate over. Assume without loss of generality that if D exists in either schema it exists in X (i.e. $D \not\subset X \Rightarrow D \not\subset Y$).

Figure 4:
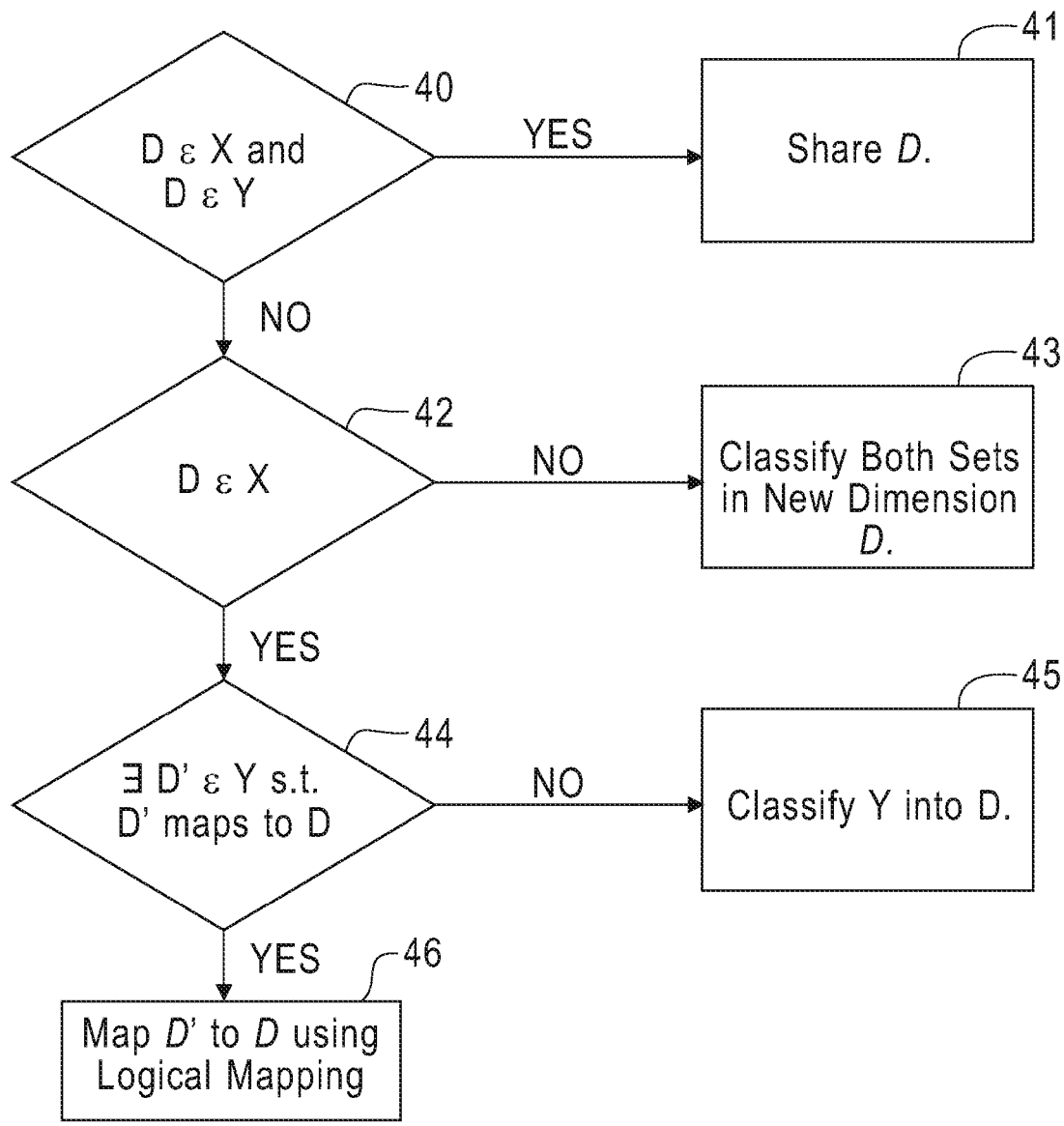
FIG. 4 is an illustration of the shared dimension process.
Figure 6:
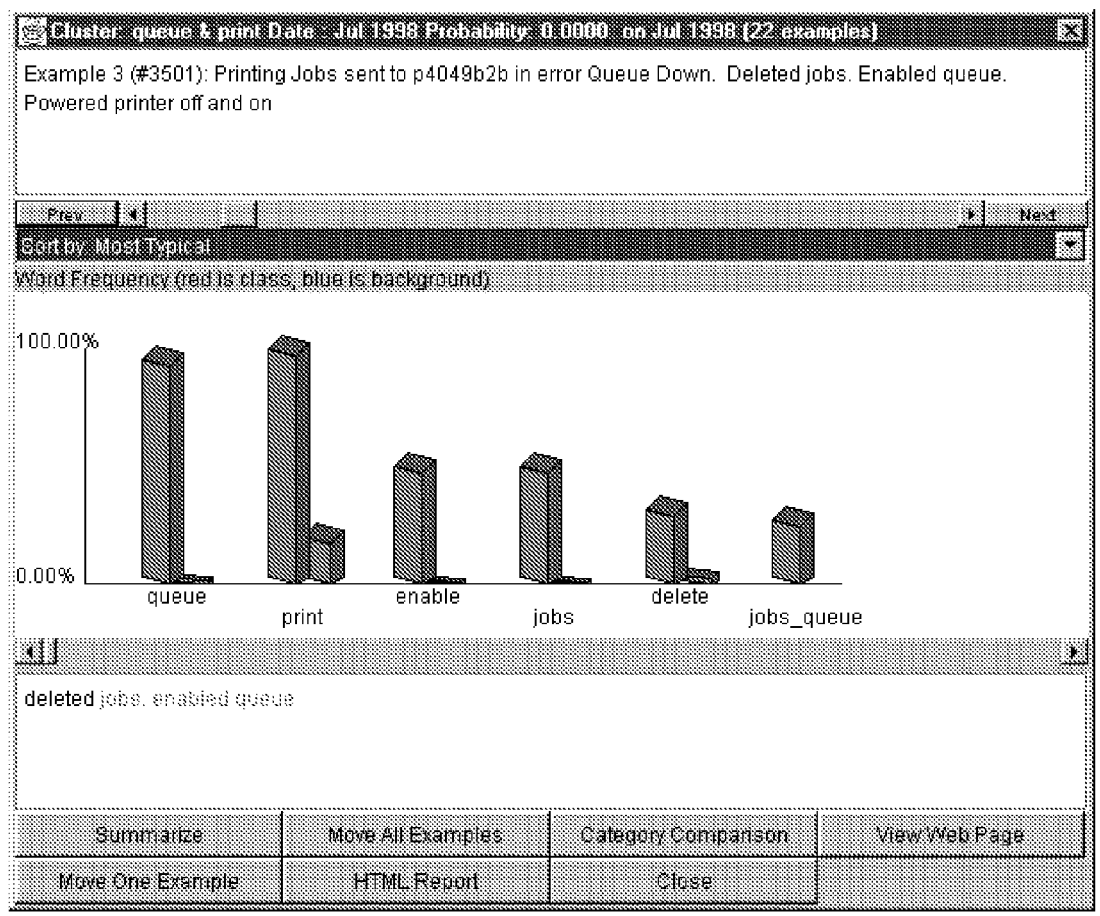
FIG. 6 shows an exemplary display of eClassifier.

To create a shared dimension between two schemas, X and Y, the process illustrated in FIG. 4 is followed. Suppose D is the desired shared dimension, then there are the following cases: If D exists in both X and Y (40), then it is already a shared dimension and nothing more needs to be done (41). Note: If X and Y share a dimension with the same meaning but in a different format (for instances fluid ounces vs. milliliters) then it should be considered a case of two dimensions for which a logical mapping exists, not a shared dimension. For example: a product hierarchy dimension in both schemas.

If D does not exist in either schema (42), then both datasets need to be classified into a new dimension D (43). For example: both datasets contain textual data and the invention wants to create a new shared dimension called SUBJECT. Supervised clustering using a tool such as eClassifier can be used to create the new dimension by clustering the text fields into different subjects.

If D exists in X and not in Y (44), the latter dataset needs to be classified in D (45). If there exists a D' in Y such that D' maps to D, then use this mapping to do the classification of Y's data in dimension D (46). For example: X has a DATE dimension and Y has a TIMESTAMP dimension which contains the time in milliseconds since 1970. Here a mapping from TIMESTAMP data to DATE data can be done using a simple function. If no such mapping exists, use classification techniques to classify Y's data into D. For example: X has a PRODUCT dimension whereas Y does not and there is textual data in Y. A text classifier can be used to classify Y's data into the PRODUCT dimension.

When there is no pre-existing shared dimension between X and Y one can be created using classification or clustering techniques providing that the dimension the invention desires to make shared is nominal in nature; X and Y (or only Y in the case where D already exists in X) have dimensions available with sufficient data to classify into D with a reasonable degree of accuracy; and if no pre existing classifier is available sufficient user expertise or training data exists such that a classifier can be created. If these three conditions are satisfied then well known clustering and classification techniques can be used in order to classify examples into the nominal dimension D. For example: Suppose that X is a schema representing helpdesk tickets with the textual dimension "Problem Description" and Y is a schema containing customer comments from satisfaction surveys. The invention wishes to share a dimension "Topic" between X and Y, which exists in X but not in Y. Treating each value in Topic as a category the invention can train a classifier on the problem descriptions in X and use this classifier to classify Y's entries into topics based on the text of the customer comments.

In item 122, the invention generates a dictionary from terms in the associated text field(s) by selecting the most frequently occurring corpus terms in the associated text fields. One method for creating the dictionary (122) counts the total number of occurrences (n) as well as the number of occurrences in the subset R (r). For each word that appears in the text data set the number of documents it occurs in is counted. The most frequently occurring words in the corpus are taken together to compose a dictionary. This reduced set of words will be used to compose a simple description of each document in the corpus. Stop words (words that are not meaningful, such as "and" or "but") may be removed and synonyms may be generated (using a stemming algorithm) and replaced. The invention disregards articles and other common language terms (e.g., and, for, of, the, a, etc.) that did not convey meaning or explanation so that the only terms included within the dictionary have meaning and content.

For each term the invention counts total occurrences (n) as well as occurrences in the subset H (r). A term is considered to occur in an example if it occurs at least once in the selected text. Multiple occurrences of a term in a document are counted the same as a single occurrence in this implementation. This could be accounted for by using a different statistical approach or by creating special term features to indicate multiple occurrences. The invention counts the total document occurrences of each term in every document (n), while also counting total document occurrences in each term in the document subset (r). For each term in the dictionary, the quantities N (the total number of documents), n (the total term/document occurrences), R (the size of the document subset), and r (the total term/document occurrences in the document subset) are calculated and stored.

For each term in the dictionary, the invention calculates the Chi-squared probability (P) that it is independent of the OLAP event 124. Given the quantities N, n, R, and r for each term in the dictionary it is well known how to calculate the probability that each term is independent of the subset R. In a population of size N, where two subsets of the population are randomly chosen of size n and R, let r be the number of elements contained in both subsets. The probability of this particular value of r occurring is given by the formula below:

$$P(r) = \frac{\binom{n}{n-r}\binom{(N-n)}{(N-n)-(R-r)}}{\binom{N}{N-R}} \text{ where } \binom{x}{y} = \frac{x!}{(x-y)!(y!)}$$

To calculate the probability of independence between the randomly chosen sets, the invention finds the expected value of r, and the sums between the probability of the actual value of r with the probability of all values of r which are even more unlikely (i.e. if r is less than expected sum from r=0 to observed; if r is greater than expected then sum from r=observed to Min(m, R)). An approximation to this probability can also be found using the Chi-squared test (see Numerical Recipes in C, pp. 620-621).

In item 126, the invention calculates the dependency of low probability terms (that have a probability value less than a predetermined maximum probability) to the criteria. The dependency is found by calculating entropy of each term for the criteria and sorting the terms in reverse order of symmetrical dependency. For those terms with P<0.01 (or some threshold), the invention calculates the Entropy (symmetrical dependency) of the term for the event 126. The terms are then sorted in reverse order of symmetrical dependency. The symmetrical dependency, U, for each term can also be calculated for each term from the values N, n, R, and r. (See Numerical Recipes in C, pp. 632-635).

For contingency table Nij $$P_{ij} = \frac{N_{ij}}{N} P_i = \frac{N_i}{N} P_j = \frac{N_j}{N}$$

$$H(x) = -\sum p_i \ln p_i$$

$$H(y) = -\sum p_j \ln p_j$$

$$H(x, y) = -\sum p_{ij} \ln p_{ij}$$

$$U(x, y) \equiv 2\left[\frac{H(y) + H(x) - H(x, y)}{H(x) + H(y)}\right]$$

Thus, in item 126 only those terms with Chi-squared probability less than 0.01 (or some other threshold) will be considered. The terms are then sorted in order from highest to lowest symmetrical dependency. At the beginning of the list will then be the terms that are both significant in their relation to the subset and also most helpful in identifying the members of the subset.

The invention then identifies portions of the text that include high dependency terms (that have a dependency ranking above a predetermined minimum dependency) as representative text descriptions in item 128. The representative text descriptions can be only those text fields that include all the high dependency terms. The invention can also optionally select the shortest phrase, shortest sentence, shortest paragraph, etc. containing all of the high dependency terms as the representative text description. In addition, the invention can generate probability values and dependency values (using the same processes mentioned above) for data fields that are not within the subset, but are related to data fields that are within the subset.

In the subset of documents, R, the invention finds those documents that contain all M terms of highest dependency value. If some specified minimum number of documents do not contain all M terms, then the invention reduces M by one and repeats the search. The invention continues until some specified minimum number of documents is found which contains all M terms.

The invention desires to find a short, coherent phrase that contain all the words of M's highest symmetrical dependency. Several approaches may be employed, including but not limited to the shortest phrase containing all M words; the shortest sentence containing all M words; and the shortest paragraph containing all M words. The specific application and text format may determine which of these methods works best.

Categorical, nominal, or discretized data base dimensions may be analyzed in the same way that terms are analyzed above. Those categories which co-occur with P<0.01 and have the highest dependency will be chosen for adding additional information to the text explanation. For example, the text "Date is Dec. 31, 2001 more often than expected for these examples (23/24)" might be added to a text explanation to indicate that 23 out of 24 of the selected examples covered by the explanation occurred on Dec. 31, 2001 and that this was a higher number than would be expected by random chance.

Thus, in one example, the invention would find all text examples containing all of the top M dependency terms, find the top categorical value for each, select representative text from these examples to display as the text explanation (so that all of the M terms are included in the text), and highlight the M terms in the display. The invention can optionally analyze other non-text features of the data in parallel, selecting the top M dependency features that co-occur with the selected event and bring these feature values to the users attention as part of the text explanation.

This invention is implemented as a computer program, written in the Java programming language and running on top of the Java virtual machine. This section describes a sample text explanation scenario using one implementation. In this implementation, the text explanation process relies on two specialize tools.

Figure 5:
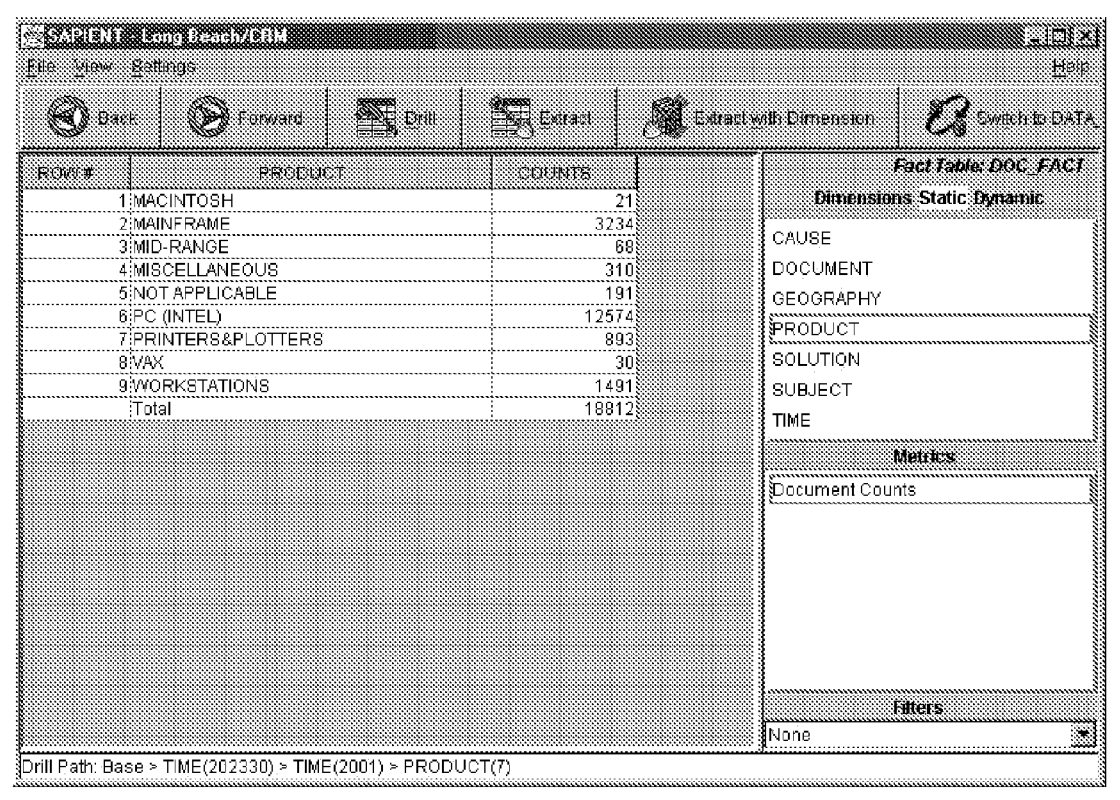

The first such tool is "Sapient" that is available from IBM, Armonk, N.Y., USA, and is an application that allows for exploration of data cubes that have a star schema. A report view and navigational controls of Sapient are illustrated in FIG. 5. The report view allows for the viewing of the results of data queries on a data cube. The reports can be summary tables, trend line graphs or pie charts (and potentially many other report formats). An important part of the navigational controls are the dimensions and metrics selection boxes shown in FIG. 5. The dimension selection box allows the selection and drill down on each dimension. This includes drilling down a dimension hierarchy or cross drilling from one dimension to another. The metric selection box allows for the selection of the metrics that are computable for the given data cube. Additional navigation buttons allow forward and backward navigation to view previous reports, and the drill button to initiate the query to drill a hierarchy or cross drill a dimension.

The second such tool is "eClassifier" that is available from IBM, Armonk, N.Y., USA, and is a tool for the clustering, analysis and understanding of unstructured and semi-structured text. Further description of eClassifier can be obtained by referring to U.S. Pat. No. 6,424,971 (incorporated herein by reference). Both Sapient and eClassifier are implemented in the Java programming language. The sub-setting and field selection parts of the text explanation process are driven from within Sapient. The document subset is then passed to eClassifier which performs the remainder of the process and presents the results.

The dataset used in the following example is one created from helpdesk tickets. It is a single star schema with several fields. The important structured fields for this example are TIME and PRODUCT. There are several text fields, the most important of which are DESCRIPTION (where the problem is described) and SOLUTION (how the problem was solved). Suppose that using Sapient's reporting features, which include graphs over time, a help desk analyst notices a spike in user complaints in July. The analyst drills first on the year, then on the month and notices that there are an unusually high number of complaints related to printing for that month. Suspecting that this is the cause of the increase in complaints the user selects the subset resulting from the drill all by Time>drill 2001 by Time>drill July by Product and finally selecting PRINTERS&PLOTTERS subset for explanation by the eClassifier tool.

Before the export to eClassifier can take place the user selects the database fields where the source data resides. In this example, the user chooses the problem description and problem resolution text fields as the ones to use to explain the spike. Documents composed of the combination of these two fields are now exported to eClassifier. eClassifier examines the documents imported from the Sapient application in order to generate a 2000 term dictionary over the words in these documents. Once the dictionary is generated it is used to explain the selected subset of documents.

For each term the total number of occurrences (n) is counted as well as the occurrences in the subset R (r). For each term the invention calculate the Chi-squared probability (P) that it is independent of the OLAP event. For those terms with P<0.01 (or some threshold), the invention calculates the entropy (symmetrical dependency) of the term for the event. The terms are then sorted in reverse order of symmetrical dependency. These steps are run in order to obtain a list of terms sorted by entropy where P<0.01.

Figure 7:
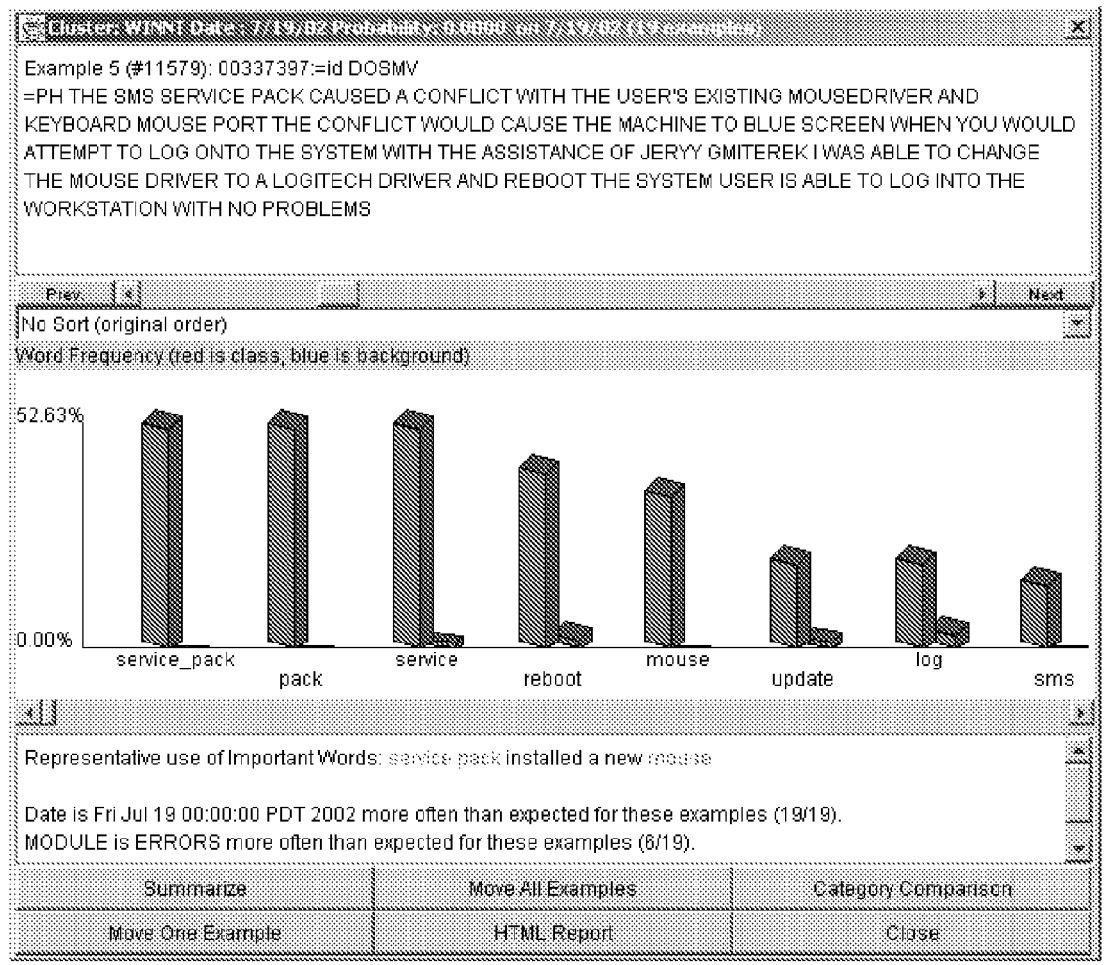
FIG. 7 shows an exemplary display of eClassifier.

In eClassifier M is set to 3 by default. In this case the top 3 entropy terms are 'queue', 'enabled', and 'jobs' as shown in FIG. 7. All documents are scanned and 22 are found which contain all of the terms. As shown in FIG. 8, eClassifier selects relevant text from the explaining documents to explain the document subset.

Provided below is an exemplary pseudocode of the processing undertaken with one aspect of the invention.

```
Initialize:
    Text clustering tc;
    N←0;
    R←document subset of interest;
    D←full set of documents;
    W←set of all dictionary terms;
    for all w ∈W doccount [w]←0;
    for all w ∈W repcount [w]←0;
/*For all data elements count term occurrences within the
subset and the data set as a whole*/
        for all d∈D{
            N++;
            for all n∈W {
                if w is in d {
                    docCount [w]++;
                    if d ∈R {repCount[w]++};
                }
            }
        }
/*For all terms whereP□ 0.01 calculate entropy and chi-
squared values*/
        for all a ∈W {
            prob[w] □ Chi-squared (N, docCount[w], □R□,
repCount[w]);
            if prob[w] >0.01 {
```

-continued

```
                entropy[w] □ 0.0
        } else {
                entropy[w] □
                        calcEntropy(N, □R□, docCount[w],
repCount[w])
        }
}
/*Sort by entropy and select best 2 to 3 terms*/
sortedTerms □ sortHighToLow (W, entropy);
        candidate □
                {sortedTerms[0], sortedTerms [1],
sortedTerms [2] };
        while candidate not= □ {
                if testCandidate (R, candidate, sortedTerms)
> 2
                        break;
                candidate □
                        getCandidate (candidate, sortedTerms,
entropy);
        }
        if candidate=□ {
                return NO_DESCRIPTION;
        }
        terms □ candidate;
/*Find all examples containing the terms.*/
        results □ □;
        for all d€R {
                if .w€terms, w€d {results □ results+d};
        }
        descript □ findPhrase (result);
/*Returns number of documents containing all terms*/
        METHOD testCandidate (R, candidate, sortedTerms)
        Initialize:
                result □ 0
        for all d€R {
                if . w€candidate, w€d {result++};
        }
        return result;
        END METHOD
/*Returns the next combination od terms with high entropy
that the invention have not seen.*/
METHOD getCandidate (candidate, sortedTerms, prob)
if all term combinations have been examined or
        . k s.t. prob[candidate[k]]□0.1 {
                return □;
}
result □ next unseen combination from sorted terms picked
from the start of the list;
return result;
END METHOD
/*Finds the shortest phrase containing all terms.*/
METHOD findPhrase(D, terms)
Initialize:
                min_len □ MAX_INT;
        for all d€D {
                phrase = shortest span in d containing all terms
and starting and ending on sentence boundaries.
                if (□phrase□<min_len) {
                        best_phrase □ phrase;
                        min_len □ □phrase□;
                }
        }
        return best_phrase;
                END METHOD
```

This invention enables data analysts to quickly discover the underlying meaning behind a selected subset of data. A subset of data selected via any database query is compared to the superset of all data along an unstructured text dimension. The result is a simple phrase or sentence that indicates how this subset differs from the superset in terms of representative content. This allows the data analyst to answer the question "why" in addition to answering the question "what". For example, prior to the invention, a data analyst might discover that some products had a higher rate of failure than others for the previous month. This is the "what" answer. With this invention the analyst might quickly discover that these selected products had a higher rate of "frayed power cords" than seen in other products during other periods of time. This answers the question "why". In general this invention gleans detailed information from the unstructured text field in the database and applies it in a meaningful way to query results. This can benefit any database analysis where the data is a mixture of structured and unstructured information.

While the invention has been described in terms of preferred embodiments, those skilled in the art will recognize that the invention can be practiced with modification within the spirit and scope of the appended claims.

What is claimed is:

1. A computer-implemented method of analyzing at least one database having non-text data in data fields and text in text fields, said method comprising:

selecting, by a computing device, a subset of said database based upon a database query, wherein said subset includes a plurality of data fields and a plurality of associated text fields;

generating, by said computing device, a dictionary comprising terms from said associated text fields;

generating, by said computing device for each term in said dictionary, a probability that each term in said dictionary is independent of said subset;

calculating and sorting in order from highest to lowest, a dependency of low-probability terms in said dictionary to said database query terms, wherein said low probability terms have a probability value less than a predetermined maximum probability;

identifying, as representative text descriptions, by said computing device, portions of said plurality of associated text fields that include high-dependency terms from said sorting in order from highest to lowest; and outputting, by said computing device, said representative text descriptions that explain an event that was the basis for said database query.

2. The method in claim 1, wherein said selecting process searches multiple databases.

3. The method in claim 2, wherein said selecting process creates shared dimensions for databases that do not share common attributes.

4. The method in claim 1, further comprising, before said generating of said dictionary, selecting a representative text field from said at least one associated text field.

5. The method in claim 1, wherein said generating of said dictionary comprises selecting most frequently occurring corpus terms.

6. The method in claim 1, wherein said analyzing of said dictionary comprises a statistical analysis that determines the independence between said criteria and said terms.

7. The method in claim 1, wherein said process of identifying said representative text descriptions only identifies text fields that include all said event terms.

8. A program storage device readable by machine, tangibly embodying a program of instructions executable by the machine to perform a method of analyzing at least one database having non-text data in data fields and text in text fields, said method comprising:

selecting a subset of said database based upon a database query, wherein said subset includes a plurality of data fields and a plurality of associated text fields;

generating a dictionary comprising terms from said associated text fields;

generating, by said computing device for each term in said dictionary, a probability that each term in said dictionary is independent of said subset;

calculating and sorting in order from highest to lowest, a dependency of low-probability terms in said dictionary to said database query terms, wherein said low probability terms have a probability value less than a predetermined maximum probability;

plurality of associated text fields that include high-dependency terms from said sorting in order from highest to lowest; and outputting, by said computing device, said representative text descriptions that explain an event that was the basis for said database query.

9. The method in claim 8, wherein said selecting process searches multiple databases.

10. The method in claim 9, wherein said selecting process creates shared dimensions for databases that do not share common attributes.

11. The method in claim 8, wherein said method further comprises, before said generating of said dictionary, selecting a representative text field from said at least one associated text field.

12. The method in claim 8, wherein said generating of said dictionary comprises selecting most frequently occurring corpus terms.

13. The method in claim 8, wherein said analyzing of said dictionary comprises a statistical analysis that determines the independence between said criteria and said terms.

14. The method in claim 8, wherein said process of identifying said representative text descriptions only identifies text fields that include all said event terms.

15. A computer-implemented method of analyzing at least one database having non-text data in data fields and text in text fields, said method comprising:

selecting, by a computing device, by a query a subset of said database based upon search criteria, wherein said subset includes at a plurality of data fields and a plurality of associated text fields;

generating, by said computing device, a dictionary comprising terms from said associated text fields, comprising selecting said terms that occur most frequently in said associated text field, such that said terms are selected from results of said selecting of said subset of said database;

generating, by said computing device for each term in said dictionary, a probability that each term in said dictionary is independent of said subset;

calculating and sorting in order from highest to lowest, a dependency of low-probability terms in said dictionary to said database query terms, wherein said low probability terms have a probability value less than a predetermined maximum probability;

identifying, by said computing device, as representative text descriptions, portions of said plurality of associated text fields that include high-dependency terms from said sorting in order from highest to lowest; and outputting, by said computing device, said representative text descriptions that explain an event that was the basis for said database query.

16. The method in claim 15, wherein said selecting process searches multiple databases.

17. The method in claim 16, wherein said selecting process creates shared dimensions for databases that do not share common attributes.

18. The method in claim 15, further comprising, before said generating of said dictionary, selecting a representative text field from said at least one associated text field.

19. The method in claim 15, wherein said generating of said dictionary comprises selecting most frequently occurring corpus terms.

20. The method in claim 15, wherein said analyzing of said dictionary comprises a statistical analysis that determines the independence between said search criteria and said terms.

21. The method in claim 15, wherein said process of identifying said representative text descriptions only identifies text fields that include all said terms.

22. A program storage device readable by machine, tangibly embodying a program of instructions executable by the machine to perform a method of analyzing at least one database having non-text data in data fields and text in text fields, said method comprising:

selecting by a query a subset of said database based upon search criteria, wherein said subset includes at a plurality of data fields and a plurality of associated text fields;

generating a dictionary comprising terms from said associated text fields, comprising selecting said terms that occur most frequently in said associated text field, such that said terms are selected from results of said selecting of said subset of said database;

generating, by said computing device for each term in said dictionary, a probability that each term in said dictionary is independent of said subset;

calculating and sorting in order from highest to lowest, a dependency of low-probability terms in said dictionary to said database query terms, wherein said low probability terms have a probability value less than a predetermined maximum probability;

identifying, as representative text descriptions, portions of said plurality of associated text fields that include high-dependency terms from said sorting in order from highest to lowest; and outputting, by said computing device, said representative text descriptions that explain an event that was the basis for said database query.

23. The method in claim 22, wherein said selecting process searches multiple databases.

24. The method in claim 23, wherein said selecting process creates shared dimensions for databases that do not share common attributes.

25. The method in claim 22, wherein said method further comprises, before said generating of said dictionary, selecting a representative text field from said at least one associated text field.

26. The method in claim 22, wherein said generating of said dictionary comprises selecting most frequently occurring corpus terms.

27. The method in claim 22, wherein said analyzing of said dictionary comprises a statistical analysis that determines the independence between said search criteria and said terms.

28. The method in claim 22, wherein said process of identifying said representative text descriptions only identifies text fields that include all said terms.

* * * * *